US012677245B2

(12) United States Patent
Teixeira et al.

(10) Patent No.: US 12,677,245 B2
(45) Date of Patent: Jul. 7, 2026

(54) 5G-BASED RADIOFREQUENCY IDENTIFICATION TECHNOLOGY

(71) Applicant: T-Mobile USA, Inc., Bellevue, WA (US)

(72) Inventors: Joao Teixeira, Shawnee, KS (US); Robert Butler, Overland Park, KS (US); Lyle Walter Paczkowski, Mission Hills, KS (US); Marouane Balmakhtar, Fairfax, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 501 days.

(21) Appl. No.: 18/325,964

(22) Filed: May 30, 2023

(65) Prior Publication Data

US 2024/0406922 A1 Dec. 5, 2024

(51) Int. Cl.
*H04W 64/00* (2009.01)
*H04B 5/77* (2024.01)
*H04B 7/0413* (2017.01)

(52) U.S. Cl.
CPC ............ *H04W 64/003* (2013.01); *H04B 5/77* (2024.01); *H04B 7/0413* (2013.01)

(58) Field of Classification Search
CPC ...... H04W 64/003; H04B 5/77; H04B 7/0413
USPC ...................................................... 455/456.1
See application file for complete search history.

(56) References Cited

U.S. PATENT DOCUMENTS

| | | | |
|---|---|---|---|
| 6,008,727 A | 12/1999 | Want et al. | |
| 7,009,517 B2 | 3/2006 | Wood | |
| 7,027,808 B2 | 4/2006 | Wesby | |
| 7,091,864 B2 | 8/2006 | Veitch et al. | |
| 7,151,456 B2 | 12/2006 | Godfrey | |
| 7,952,323 B2 | 5/2011 | Lamothe | |
| 7,956,746 B2 | 6/2011 | Truscott et al. | |
| 8,340,622 B2 | 12/2012 | Kelleher et al. | |
| 8,475,716 B2 | 7/2013 | Potyrailo et al. | |
| 8,550,360 B2 | 10/2013 | Sabbah et al. | |
| 8,825,435 B2 | 9/2014 | Smid et al. | |
| 8,890,657 B2 | 11/2014 | Lin et al. | |
| 8,988,249 B2 | 3/2015 | Chevrette et al. | |
| 9,097,637 B2 | 8/2015 | Pagani et al. | |
| 9,171,209 B2 | 10/2015 | Townend et al. | |
| 9,183,419 B2 | 11/2015 | Ung et al. | |

(Continued)

FOREIGN PATENT DOCUMENTS

| | | |
|---|---|---|
| CN | 202854925 U | 4/2013 |
| CN | 102685249 B | 8/2015 |

(Continued)

*Primary Examiner* — Qutbuddin Ghulamali
(74) *Attorney, Agent, or Firm* — Perkins Coie LLP

(57) ABSTRACT

A system includes a radiofrequency identification (RFID) integrated circuit (IC) associated with a mobile asset. The 5GID-IC can store sensor data collected from sensors of the mobile asset and generate tracking data of the mobile asset based on that sensor data. The 5GID-IC responds to radiofrequency (RF) signals radiated on the RFID device, where the RF signals have frequencies in a licensed spectrum of a 5G telecommunications network. The system includes a reader device configured to independently check multiple 5GID-ICs of mobile assets for tracking data. The reader device includes a communications circuit that can retrieve the tracking data from the 5GID-IC of the mobile asset.

19 Claims, 4 Drawing Sheets

(56) References Cited

U.S. PATENT DOCUMENTS

| | | | |
|---|---|---|---|
| 9,356,642 | B1 | 5/2016 | Peric et al. |
| 9,400,967 | B2 | 7/2016 | O'hern |
| 9,549,406 | B1 | 1/2017 | Bowers et al. |
| 9,571,176 | B2 | 2/2017 | Desclos et al. |
| 9,590,796 | B2 | 3/2017 | Vertes et al. |
| 9,614,553 | B2 | 4/2017 | Pistor et al. |
| 9,825,358 | B2 | 11/2017 | Chen et al. |
| 9,851,386 | B2 | 12/2017 | Keller et al. |
| 9,940,489 | B2* | 4/2018 | Weidinger ......... G06K 7/10009 |
| 10,054,367 | B2 | 8/2018 | Bayram et al. |
| 10,055,619 | B2 | 8/2018 | Finke |
| 10,097,978 | B2 | 10/2018 | Hoffmann |
| 10,102,406 | B2 | 10/2018 | Venture et al. |
| 10,601,650 | B2 | 3/2020 | Gerspach et al. |
| 10,607,184 | B2 | 3/2020 | Taulbee et al. |
| 10,685,335 | B2 | 6/2020 | Buca et al. |
| 10,719,674 | B2 | 7/2020 | Fischer |
| 10,804,594 | B2 | 10/2020 | Janvrin et al. |
| 10,839,179 | B2 | 11/2020 | Pettus |
| 10,970,497 | B2 | 4/2021 | Caselli et al. |
| 10,979,971 | B2 | 4/2021 | Mccoy et al. |
| 11,062,099 | B1 | 7/2021 | Wagner et al. |
| 11,107,337 | B2 | 8/2021 | Hill et al. |
| 11,146,104 | B2 | 10/2021 | La Rosa et al. |
| 11,176,795 | B2 | 11/2021 | Gonzalez et al. |
| 11,216,625 | B2 | 1/2022 | Pettus |
| 11,348,067 | B2 | 5/2022 | Schoening |
| 11,397,916 | B2 | 7/2022 | Kingston |
| 11,569,848 | B2 | 1/2023 | Payton et al. |
| 2005/0258937 | A1 | 11/2005 | Neuwirth |
| 2007/0176748 | A1 | 8/2007 | Salamitou |
| 2007/0285241 | A1 | 12/2007 | Griebenow et al. |
| 2008/0068170 | A1 | 3/2008 | Ehrman et al. |
| 2008/0180248 | A1 | 7/2008 | Lian et al. |
| 2008/0204247 | A1 | 8/2008 | Lian et al. |
| 2009/0128303 | A1 | 5/2009 | Hovav et al. |
| 2009/0267729 | A1 | 10/2009 | Rowe et al. |
| 2010/0090004 | A1 | 4/2010 | Sands et al. |
| 2010/0260149 | A1 | 10/2010 | Wu |
| 2011/0015521 | A1 | 1/2011 | Faul |
| 2011/0078074 | A1* | 3/2011 | Lipman .................. G06Q 20/10 |
| | | | 705/347 |
| 2011/0285535 | A1 | 11/2011 | Barwin |
| 2012/0176219 | A1 | 7/2012 | Fiorucci et al. |
| 2013/0127616 | A1 | 5/2013 | Robitaille |
| 2013/0181868 | A1 | 7/2013 | Le et al. |
| 2014/0074667 | A1 | 3/2014 | Smith |
| 2014/0240088 | A1* | 8/2014 | Robinette .......... G08B 21/0219 |
| | | | 340/5.61 |
| 2016/0129960 | A1* | 5/2016 | Akins .................. H04W 4/021 |
| | | | 340/427 |
| 2019/0006030 | A1 | 1/2019 | Mullin et al. |
| 2019/0394720 | A1* | 12/2019 | McCoy ................. H04W 48/18 |
| 2020/0134543 | A1 | 4/2020 | Pizzi |
| 2021/0067923 | A1 | 3/2021 | Stein et al. |
| 2021/0219102 | A1 | 7/2021 | Gion et al. |
| 2021/0330190 | A1 | 10/2021 | Arwari et al. |
| 2022/0137178 | A1 | 5/2022 | Hill et al. |
| 2022/0141647 | A1 | 5/2022 | Castellanos Zamora et al. |
| 2022/0217719 | A1 | 7/2022 | Beyer |
| 2022/0236072 | A1 | 7/2022 | Jones et al. |
| 2022/0318529 | A1 | 10/2022 | Vaught et al. |
| 2022/0327342 | A1 | 10/2022 | Haslam et al. |
| 2022/0393929 | A1 | 12/2022 | Geng et al. |
| 2023/0028603 | A1 | 1/2023 | Volkerink et al. |
| 2025/0220024 | A1* | 7/2025 | Simons .................. G06F 21/62 |

FOREIGN PATENT DOCUMENTS

| | | |
|---|---|---|
| CN | 103383811 B | 4/2018 |
| CN | 112312382 A | 2/2021 |
| DE | 202015009166 U1 | 11/2016 |
| DE | 112010004615 B4 | 5/2023 |
| EP | 2060997 A1 | 5/2009 |
| EP | 2092466 A2 | 8/2009 |
| EP | 2330538 A1 | 6/2011 |
| EP | 2027658 B1 | 12/2011 |
| EP | 2875629 B1 | 10/2019 |
| JP | 2017538641 A | 12/2017 |
| KR | 20060027314 A | 3/2006 |
| KR | 101630531 B1 | 6/2016 |
| KR | 102265309 B1 | 6/2021 |
| WO | 2008050312 A2 | 5/2008 |
| WO | 2009052455 A1 | 4/2009 |
| WO | 2013037600 A1 | 3/2013 |
| WO | 2013120209 A1 | 8/2013 |
| WO | 2017072652 A1 | 5/2017 |
| WO | 2020219537 A1 | 10/2020 |
| WO | 2021245565 A1 | 12/2021 |

* cited by examiner

5G-BASED RADIOFREQUENCY IDENTIFICATION TECHNOLOGY

BACKGROUND

Radiofrequency identification (RFID) uses electromagnetic fields to identify and track electronic tags ("tags") attached to objects. In one example, an RFID system includes a small radio transponder, a radio receiver, and a radio transmitter. When triggered by an electromagnetic interrogation pulse from a nearby RFID reader device, the tag transmits digital data, usually an identifying inventory number, back to the reader device. The inventory number can be used to track inventory goods.

BRIEF DESCRIPTION OF THE DRAWINGS

Detailed descriptions of implementations of the present invention will be described and explained through the use of the accompanying drawings.

Figure 1:
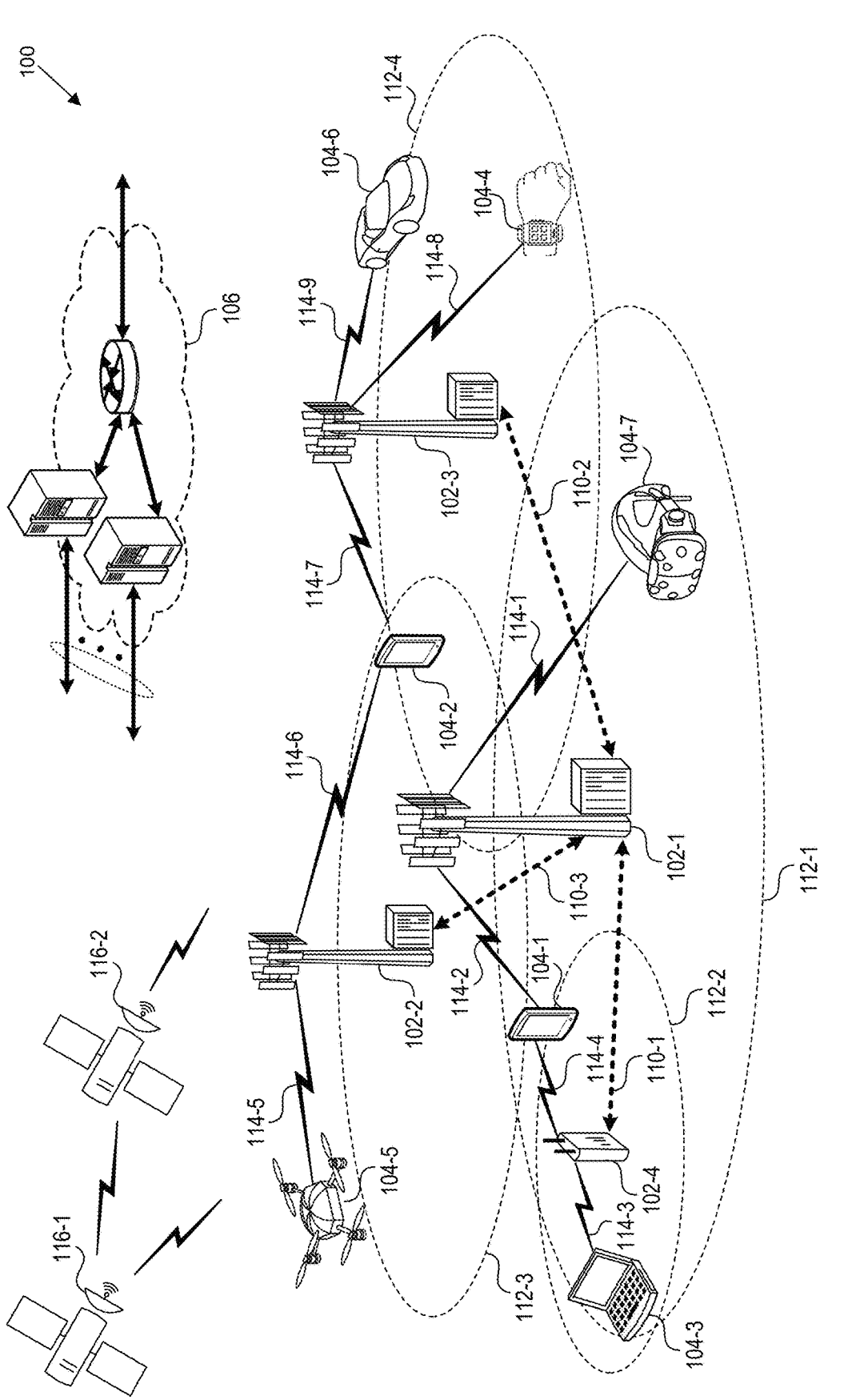
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed 5GID technology relates to radiofrequency identification (RFID) technology that is enhanced with a fifth generation (5G) telecommunications network. The 5GID technology provides an RFID integrated circuit selective beaconing for location and vector mapping. A 5GID system includes RFID technology that is enhanced with capabilities including broadband cellular networks that are connected to the Internet and telephone network by radio waves through local antenna. The 5G enables higher bandwidth and can thus connect more and different devices, improving the quality of tracking services in expansive geographic areas. Due to the increased bandwidth, new applications for 5GID are in internet-of-things (IoT) and machine-to-machine areas.

5GID provides tracking that enables a company to manage assets (e.g., resources, products). The tracked information can include location, as well as more sophisticated metrics generated by advanced statistical methods and artificial intelligence. Unfortunately, as an organization grows, gathering this data becomes complicated due to the number and geographic distribution of these assets expanding dramatically. 5GID overcomes challenges of conventional RFID, which can only broadcast information across a short range and enables broadcast of more and different data unlike the typical inventory number that is broadcast by an RFID tag.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3, which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

System for 5G-Based Radiofrequency Identification (5GID)

Figure 2:
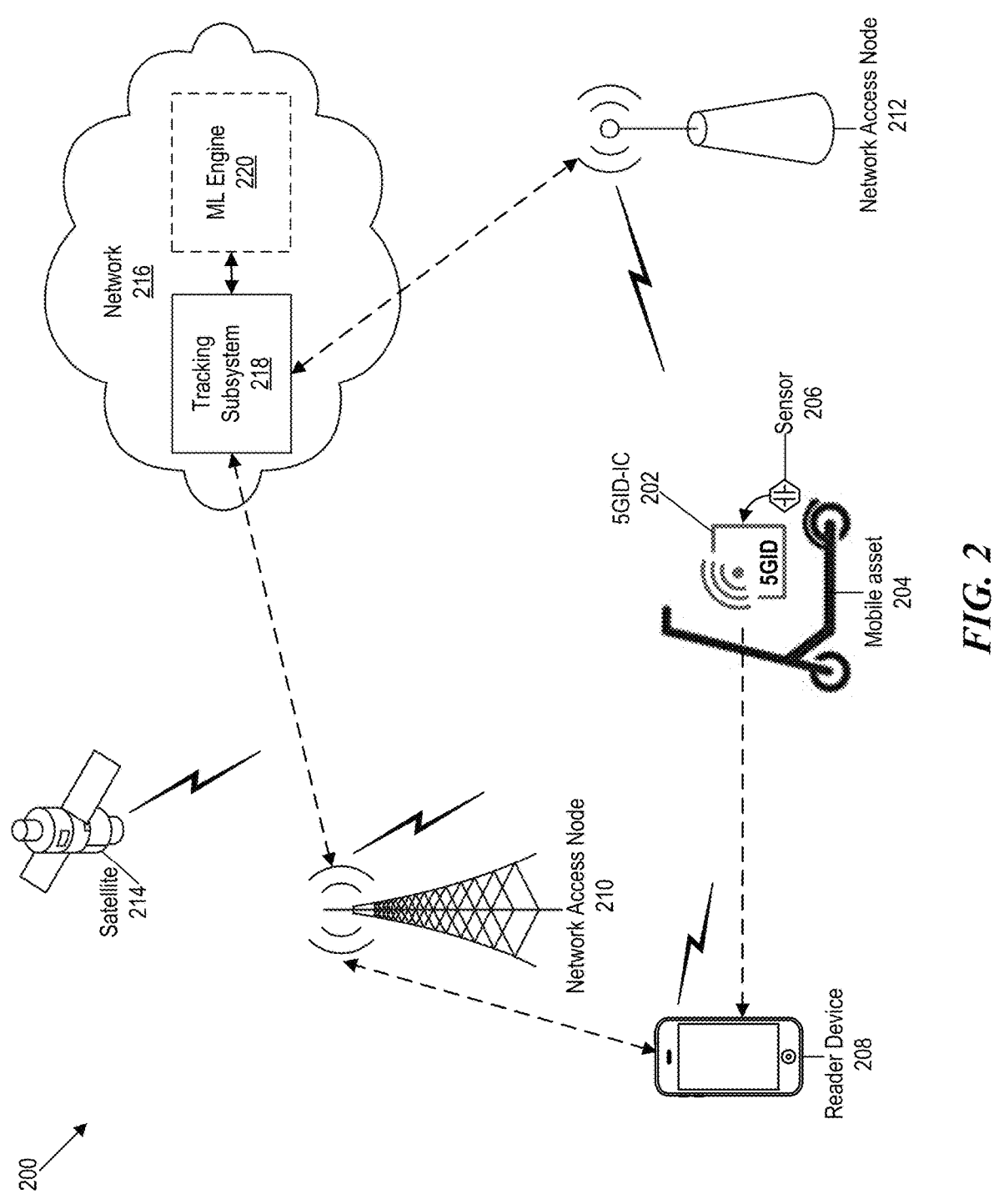
FIG. 2 is a block diagram that illustrates a system for a 5G-based radiofrequency identification (5GID).

FIG. 2 is a block diagram that illustrates a system for 5G-based radiofrequency identification (5GID) technology. The system 200 includes a 5GID integrated circuit (IC) 202 ("5GID-IC 202") that is associated with a mobile asset 204. The 5GID-IC 202 receives sensor data from one or more sensors 206 (referred to herein as "sensor 206") that are integrated on the 5GID-IC 202 or disposed separately on the mobile asset 204. A reader device 208 can receive signals broadcast from the 5GID-IC 202, which can be energized and activated from signals received in the licensed spectrum for the 5G telecommunications network from one or more network nodes. In the illustrated example, the network nodes include the reader device 208, network access nodes 210 and/or 212, and satellite 214. The tracking data obtained from the 5GID-IC 202 through the reader device 208 is processed by a tracking subsystem 218, which can be enhanced by a machine learned engine 220.

The 5GID-IC 202 uses electromagnetic fields to automatically identify and track the mobile asset 204. In one example, the 5GID-IC 202 includes a radio transponder, a radio receiver, and a radio transmitter (e.g., one or more antennas). When triggered by an electromagnetic interrogation pulse, a network node of the 5G network (e.g., reader device 208, network access nodes 210 or 212, satellite 214), the 5GID-IC 202 broadcasts tracking data such as raw or processed sensor data and an identifying inventory number, to the reader device 208. The tracking data can be used not only to track the mobile asset 204 but also to determine its state, which can be used to then determine, for example, whether the mobile asset 204 experienced an event that affects its performance (e.g., was damaged) or is due for maintenance. The 5GID-IC 202 can include a set of electronic circuits on one small flat piece of semiconductor material. Large numbers of miniaturized transistors and other electronic components are integrated together on the 5GID-IC 202.

The 5GID-IC 202 can be ambiently powered with electromagnetic energy emitted from network nodes of a 5G network. The 5GID-IC 202 includes one or more antenna (not shown) that is configured to broadcast sensor or tracking data to the reader device 208. In one example, the 5GID-IC 202 is ambiently powered by signals in the licensed spectrum of the 5G network, and tracking data is communicated over that or another telecommunications network or using short-range RF signals. The antennas are configured to communicate in a range from 450 MHz to 6 GHz, or 24.25 GHz to 200 GHz. Additionally or alternatively, the antennas are configured to communicate over ranges of the 5G network including 125 kHz, 134 kHz, 13.56 MHz, 860 to 956 MHz, 433 MHZ, 2.45 GHz, or 5.6 GHZ, for example. One example of the antenna can include a Multiple-Input Multiple-Output (MIMO) antenna that is used to estimate location and/or velocity of the mobile asset 204. The antenna can be programmed to broadcast tracking data periodically or in response to being activated by the pulse of signals received from the one or more network nodes. The programmatic broadcast of tracking data requires a local power source or periodic pulses of RF energy from one or more network nodes. Hence, the 5GID-IC 202 can additionally or alternatively include its own onboard power source (e.g., battery, solar panel).

The mobile asset 204 can include a returnable and reusable asset that is used to transport people or goods or any object of a value that is tracked. The mobile asset 204 is managed to ensure security or prevent theft, assist with maintenance, etc. Thus, the mobile asset 204 is managed for availability and serviceability to move, store, secure, protect and control inventory or in conjunction with servicing. Examples include vehicles managed by a shared mobility operator. The vehicles can include electric scooters, bicycles, cars, or any other vehicle that can transport a passenger. The mobile assets are distributed under the control of individual passengers such that their location, performance status, utilization, and location vary for a network of mobile assets. The sensor 206 of the mobile asset 204 is an electronic device that monitors aspects of the mobile asset 204 and sends information to the 5GID-IC 202. Examples of the sensor for a vehicle of a mobility service include a speed sensor, voltage sensor, temperature sensor, shock sensor, and a location sensor.

The sensor 206 can be integrated in the 5GID-IC 202 or separately disposed on the mobile asset 204 and communicatively coupled to the 5GID-IC 202. In one example, the sensor 206 has a local power source to support and communicate sensor data to the 5GID-IC 202 over a wireless or wired connection. The 5GID-IC 202 can include a memory to store tracking data and a hardware processer that can process sensor data to produce tracking data or other useful data that provides insights into the status or state of the mobile asset 204. The 5GID-IC 202 is thus configured to collect sensor data output by the sensor 206 and process the sensor data into tracking data. The tracking data can include unique data items used to authorize and secure identification and enable secure communication with the reader device 208.

The reader device 208 is separate and distinct from the 5GID-IC 202 and from the associated mobile asset. The reader device 208 can also include an antenna, which is configured to emit signals that activate the 5GID-IC 202, for example, as well as receive sensor/tracking data from the 5GID-IC 202 by using at least some 5G frequencies. The reader device 208 includes an antenna that is configured to communicate the sensor/tracking data via a network access node (e.g., network access node 210) to the tracking subsystem 218 on the network 216. The reader device 208 can connect to a satellite 214 in order to determine its own location data, to be added to the sensor/tracking data before communication via the network access node 210. The reader device 208 can be mobile or affixed to a location. As shown, a mobile device runs an application to operate as the reader device 208. As such, a user can bring the reader device 208 within a threshold distance of the 5GID-IC 202 to send activating signals and/or receive the sensor/tracking data.

The network nodes including the network access nodes 210 and 212, as well as the satellite 214, can produce signals that activate the 5GID-IC 202. The received sensor/tracking data, however, is communicated to the network 216 through the network access nodes. Examples of the network access nodes can include a macro cell, a small cell, a micro cell, a femto cell, or a pico cell. The network access node can include multiple network access nodes of varied type and service area. The network access nodes 210 and 212 are separate and distinct from the reader device 208. The network access nodes are thus configured to gather sensor/ tracking data and save it at a network 216.

The tracking subsystem 218 can include one or more servers and services configured to receive, process, and store tracking data received from one or more 5GID-ICs associated with different mobile assets. The tracking subsystem 218 can include a distributed file system and/or a cloud-based database service that is configured to store the tracking data and perform further processing on the tracking data. As such, the tracking subsystem 218 can monitor multiple mobile assets leaving or returning locations and can manage safety requirements and inspection requirements and improve accountability by identifying the status of mobile assets at particular days and times.

The ML engine 220 is coupled to the tracking subsystem 218 and is configured to generate data that can be used to predict the status of a mobile asset based on the data obtained by the associated 5GID-IC. The ML engine 220 includes a model that, as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, a model can include a neural network with multiple input nodes that receive sensor/ tracking data of mobile assets. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer") one or more nodes can produce a value classifying the input that, once the model is trained, can be used as a prediction regarding whether a mobile asset is due for maintenance. In some implementations, such neural networks, known as deep neural networks, can have multiple layers of intermediate nodes with different configurations, can be a combination of models that receive different parts of the input and/or input from other parts of the deep neural network, or are convolutions-partially using output from previous iterations of applying the model as further input to produce results for the current input.

The model can be trained with supervised learning, where the training data includes the tracking data of mobile assets as input and a desired output, such as an indication of the performance of the mobile asset or need for maintenance. A representation of a type of mobile asset can be provided to the model. Output from the model can be compared to the desired output for that type of mobile asset and, based on the comparison, the model can be modified, such as by changing weights between nodes of the neural network or parameters of the functions used at each node in the neural network (e.g., applying a loss function). After applying each of the types of mobile assets or types of maintenance events in the training data and modifying the model in this manner, the model can be trained to evaluate new types of mobile assets or maintenance events.

The system 200 can also integrate reader functionality in each of the 5GID-ICs for different mobile assets to create a mesh network. The system 200 can also include multiple reader devices that are operable with different 5GID-ICs associated with different types of mobile assets. These reader devices can also be configured to triangulate the location, speed, and vector velocity of any particular 5GID-IC or multiple 5GID-ICs.

Figure 3:
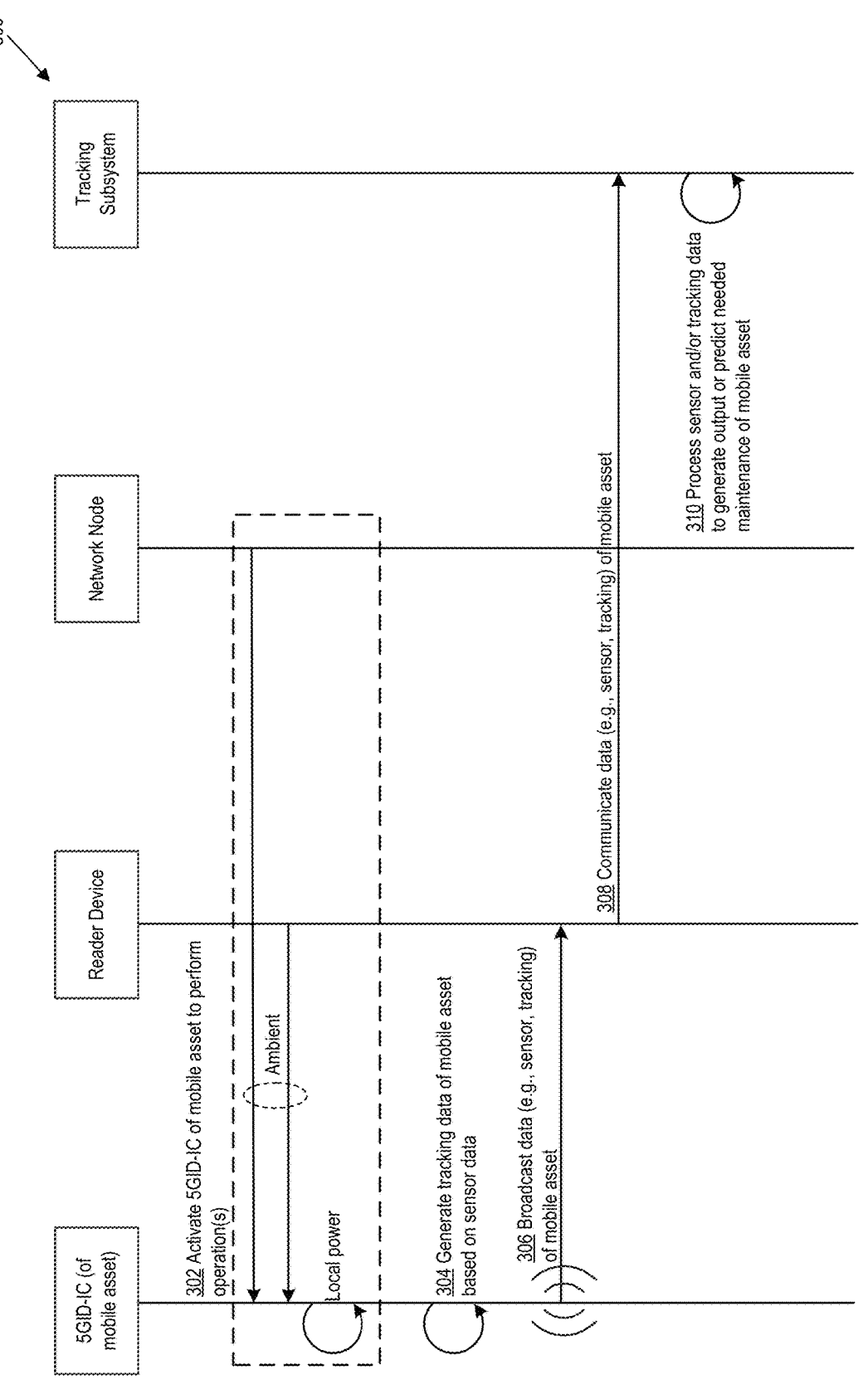
FIG. 3 is a flowchart that illustrates processes of a 5GID system.

FIG. 3 is a flowchart that illustrates processes 300 performed by components of a 5GID system ("system") including a telecommunications network configured to track one or more mobile assets. An example of a mobile asset includes a vehicle for transporting a passenger (e.g., an electric scooter, electric bicycle). The system can include 5G-based radiofrequency identification (5GID) integrated circuits (ICs) associated with respective mobile assets. The system also includes one or more reader devices configured to query the 5GID-ICs of mobile assets for sensor or tracking data (e.g., location, performance metrics). The system also includes one or more subsystems that provide one or more tracking services to manage tracking of the mobile assets. The aforementioned components include one or more data processors and one or more memories storing instructions thereon that, when executed by the data processors, cause the system to perform the processes 300.

At 302, a particular 5GID-IC of a mobile asset is activated to perform one or more operations in response to being radiated by RF energy. The 5GID-IC can be removably attachable to the mobile asset and the one or more operations can include obtaining and storing sensor data, processing the sensor data to produce tracking data (e.g., status data), broadcast the tracking data). The sensor data is obtained from one or more sensors of the mobile asset. A sensor can be integrated in the 5GID-IC or disposed separately on the mobile asset and communicatively couplable to the 5GID-IC.

The RF energy used to activate (e.g., energize) the 5GID-IC is in the licensed spectrum of the 5G telecommunications network (e.g., low-band range of 300-960 MHz, mid-band range of 1-6 GHZ, high-band range of 24-47 GHZ). In one example, an antenna of the 5GID-IC is a MIMO antenna that can receive multiple RF signals originating from different locations (e.g., different network nodes) and at different times. The tracking data can include a location of the mobile asset, which is estimated from the multiple RF signals received at the MIMO antenna.

At 304, the 5GID-IC uses the sensor data to generate the tracking data of the mobile asset (e.g., data indicative of a status of the mobile asset). The tracking data that is stored at the 5GID-IC is dynamically updated in response to being activated or can be updated programmatically. The tracking data can be indicative of use of the mobile asset (e.g., locations, speed, velocity) or occurrence of an event that relates to performance of the mobile asset (e.g., accident, inoperable). The tracking data can indicate a unique identifier of the 5GID-IC in addition to, for example, location and velocity. A current location or velocity of the 5GID-IC can be determined based on a triangulation process from network nodes that communicate signals activating the 5GID-IC. The 5GID-IC can include one or more local power sources (e.g., battery, solar) that enable programmatic (e.g., periodic) processing, storage, or broadcast of sensor data or tracking data. In another example, the 5GID-IC is ambiently powered in response to the RF energy received from network nodes (e.g., reader device, network access nodes, satellite).

At 306, the reader device can obtain the data (e.g., sensor, tracking) that is broadcast by the 5GID-IC. In particular, the reader device includes an antenna coupled to a communications circuit to receive the tracking data broadcast by the 5GID-IC in response to the query. The reader device is a network node such as an endpoint device (e.g., smartphone) or a network access node (e.g., base station) of the telecommunications network. In one example, an antenna of the reader device can emit the RF energy that powers the 5GID-IC to query for the tracking data. In another example, the reader device and one or more network nodes can query the 5GID-IC for the tracking data by emitting RF power and/or receiving the tracking data. For example, a network node such as a network access node, satellite, or endpoint device (e.g., smartphone) can radiate the RF energy as signals having a range within which presence of the 5GID-IC cause activation or broadcast of the tracking data to the reader device.

At 308, the reader device communicates, over the telecommunications network, the tracking data to a tracking subsystem. The tracking data can be obtained by the reader device when within a threshold vicinity of the 5GID-IC or over a licensed spectrum of the 5G telecommunications network. The reader device can then communicate the tracking data or data indicative of the tracking data to the tracking subsystem over the telecommunications network for further processing.

At 310, the tracking subsystem processes the tracking data as part of an inventory management service. The tracking subsystem can also perform additional functions based on the sensor data or tracking data received of multiple mobile assets. For example, the tracking subsystem can predict that a mobile asset requires maintenance. In particular, an ML engine coupled to the tracking subsystem can predict, based on tracking data, that a mobile asset requires maintenance. The ML engine can include one or more models that are trained based on sensor or tracking data of multiple 5GID-ICs associated with different types of mobile assets. The tracking subsystem can include a database configured to store sensor data, tracking data, or post-processed data of multiple 5GID-ICs. In one example, the tracking subsystem can store the tracking data to a public ledger (e.g., blockchain) to provide transparency regarding the inventory of mobile assets. In one example, the 5GID-ICs can communicate with one another via the 5G telecommunications network to share tracking data used to improve local ML models for processing sensor data to produce more useful tracking data. In yet another example, the reader device is caused to store the tracking data in a blockchain configured to track the mobile asset.

Computer System

Figure 4:
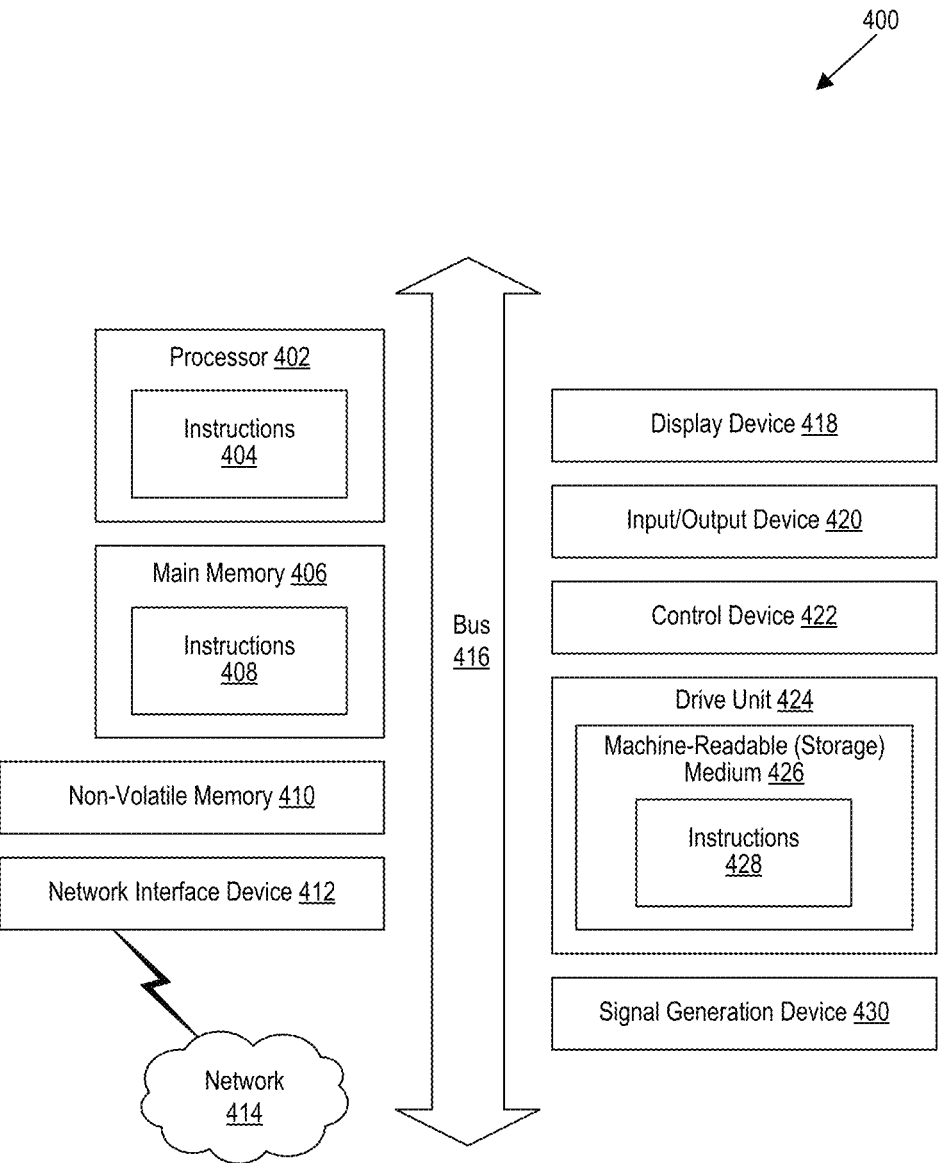
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A system of a 5G telecommunications network configured to track a mobile asset, the system comprising:
   a 5G-based radiofrequency identification (5GID) integrated circuit (IC) associated with the mobile asset, the 5GID-IC including:
      a data processor;
      a memory storing instructions thereon that, when executed by the data processor, cause the 5GID-IC to:
         store sensor data collected from a sensor associated with the mobile asset; and
         generate tracking data of the mobile asset based on the sensor data; and
      a first antenna configured to broadcast the tracking data of the mobile asset in response to the 5GID-IC being radiated by radiofrequency (RF) energy in a licensed spectrum of the 5G telecommunications network; and
   a reader device configured to retrieve tracking data of 5GID-ICs of mobile assets, the reader device including:
      a communications circuit configured to retrieve the tracking data from the 5GID-IC; and
      a second antenna coupled to the communications circuit and configured to receive the tracking data broadcast by the 5GID-IC, wherein current tracking data stored at the 5GID IC is dynamically updated in response to a query from a network node of the 5G telecommunications network of updated programmatically, and wherein the current tracking data indicates a current location or current velocity vector of the mobile asset in addition to a unique identifier of the 5GID-IC.

2. The system of claim 1:

wherein the sensor data is indicative of use of the mobile asset or occurrence of an event that relates to performance of the mobile asset, and wherein the mobile asset is a vehicle configured for transporting a passenger.

3. The system of claim 1, wherein the first antenna is a multiple-input multiple-output (MIMO) antenna configured to:

receive multiple RF signals originating from different locations and at different times, wherein the tracking data includes a location of the mobile asset estimated from the multiple RF signals received at the MIMO antenna.

4. The system of claim 1 caused to:

predict that the mobile asset requires maintenance based on an output of a machine learned model, and wherein the output is based on the tracking data, and wherein the machine learned model is trained based on sensor data of a plurality of 5GID-ICs associated with a plurality of mobile assets.

5. The system of claim 1:

wherein the 5GID-IC is removably attachable to the mobile asset, and wherein the sensor is integrated in the 5GID-IC or disposed separately on the mobile asset and communicatively couplable to the 5GID-IC.

6. The system of claim 1, wherein the licensed spectrum is included in a mid-band range of 1-6 GHz or a high-band range of 24-47 GHz.

7. The system of claim 1, wherein the reader device further comprises:

a third antenna configured to radiate the RF energy on the 5GID-IC, wherein the RF energy has a range within which presence of the 5GID-IC is required to cause activation and broadcast of the tracking data to the reader device.

8. The system of claim 1 further comprising:

a third antenna configured to radiate the RF energy to the 5GID-IC, wherein the third antenna is disposed at a device other than the 5GID-IC and the reader device, and wherein signals including the RF energy has a range within which presence of the 5GID-IC is required to cause activation and broadcast of the tracking data to the reader device.

9. The system of claim 1 further comprising:

a database configured to store tracking data of multiple 5GID-ICs, wherein the multiple 5GID-ICs are operable to communicate with one another over the 5G telecommunications network; and a machine learned engine configured to predict a particular status of a particular mobile asset tracked by a particular 5GID-IC, wherein the machine learned engine includes a model trained based on the tracking data of the multiple 5GID-ICs.

10. The system of claim 1:

wherein the reader device is an endpoint device or a network access node of the 5G telecommunications network, and wherein the current location or velocity vector for the 5GID-IC is determined based on a triangulation process from multiple reader devices or network access nodes.

11. The system of claim 1, wherein the reader device is caused to:

store the tracking data in a blockchain configured to track the mobile asset.

12. The system of claim 1, wherein the 5GID-IC comprises:

one or more battery sources, wherein the 5GID-IC is programmed to broadcast tracking data periodically.

13. The system of claim 1, wherein the 5GID-IC is ambiently powered in response to the RF energy received from the reader device or received from a network access node other than the reader device.

14. A non-transitory, computer-readable storage medium storing instructions recorded thereon that, when executed by at least one data processor of a system of a 5G telecommunications network, cause the system to:

activate a 5GID-IC in response to radiofrequency (RF) energy radiated on the 5GID-IC, wherein the RF energy has a frequency in a licensed spectrum of the 5G telecommunications network, and wherein the 5GID-IC is associated with a physical asset that is configured for mobility and has a sensor configured to measure performance of the physical asset;

determine a status of the physical asset based on sensor data obtained from the sensor; and broadcast a signal including an indication of the status of the physical asset to a reader device within a range of the signal, wherein current tracking data stored at the 5GID-IC is dynamically updated in response to a query from a network node of the 5G telecommunications network or updated programmatically, and wherein the current tracking data indicates a current location or current velocity vector of the physical asset in addition to a unique identifier of the 5GID-IC.

15. The non-transitory, computer-readable storage medium of claim 14:

wherein the 5GID-IC is configured to broadcast the signal including the indication of the status of the physical asset in response to being radiated by the RF energy, and wherein a source of the RF energy is the network node of the 5G telecommunications network.

16. The non-transitory, computer-readable storage medium of claim 14, wherein the system is caused to:

programmatically communicate status information of the physical asset to the reader device, wherein the 5GID-IC is powered by a battery power source.

17. The non-transitory, computer-readable storage medium of claim 14, wherein the system is caused to:

collect the sensor data from the sensor disposed on the physical asset, wherein the sensor data is indicative of use of the physical asset or occurrence of an event that relates to performance of the physical asset, and wherein the status is determined based on the sensor data.

18. A method performed by a radiofrequency identification (RFID) device in response to being radiated by signals in a licensed spectrum of a 5G telecommunications network, the method comprising:

causing the RFID device to collect sensor data indicative of use or an occurrence of an event related to performance of a mobile asset on which the RFID device is disposed;

storing the sensor data at a memory of the RFID device;

generating tracking data of the mobile asset based on the sensor data stored at the memory; and broadcasting the tracking data to a reader device configured to receive tracking data of multiple RFID devices of multiple mobile assets, wherein current tracking data stored at the RFID device is dynamically updated in response to a query from a network node of the 5G telecommunications network or updated programmatically and wherein the current tracking data indicates a current location or current velocity vector of the mobile asset in addition to a unique identifier of the RFID device.

19. The method of claim 18:

wherein the tracking data is communicated to the reader device over the licensed spectrum, and wherein the RFID device is ambiently powered.

* * * * *